United States Patent Office 3,052,641
Patented Sept. 4, 1962

3,052,641
BORON-NITROGEN POLYMERS
Allen L. McCloskey, Orange, William David English, Garden Grove, and Harry Goldsmith, Long Beach, Calif., assignors to United States Borax & Chemical Corporation, Los Angeles, Calif., a corporation of Nevada
No Drawing. Filed Aug. 3, 1959, Ser. No. 831,073
12 Claims. (Cl. 260—2)

This invention relates as indicated to boron-nitrogen polymers and has particular reference to the formation of thermally stable polymers from borazoles.

The class of materials known as borazoles are heterocyclic hexatomic ring compounds having the general formula $(BH{-}NH)_3$, and any substituents on the ring are named with "B" or "N" prefixes to designate their positions.

It has been known that unsubstituted borazole rings can be opened by various chemical or physical methods. It has also been known and accepted by those skilled in the art that substituted borazole rings are stable and do not form polymers on heating or using various other methods to induce polymerization. However, contrary to the teachings of the prior art, we have found that substituted borazoles can be made to undergo polymerization. We have found that certain of the substituted borazoles have the completely unexpected property of forming polymers which are thermally stable up to temperatures of about 600° C.

It is our theory that these substituted borazoles form polymers through linearization, and in order for the linearization of the borazoles to take place they must be heated to a sufficiently high temperature under pressure. However, regardless of whether our theory is correct, the fact remains that for the first time it has become possible to produce polymeric materials from substituted borazoles.

It is, therefore, the principal object of this invention to provide a method for the formation of polymers from substituted borazoles.

It is a further object of this invention to provide new polymers having high thermal stability.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of producing thermally stable polymers which comprises heating a substituted borazole in a closed system at a temperature of from about 350–600° C., said borazole having the following general formula

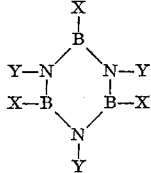

wherein X is a material selected from the group consisting of unsubstituted saturated aliphatic hydrocarbon radicals, unsubstituted aromatic hydrocarbon radicals, substituted aromatic hydrocarbon radicals containing unsubstituted saturated aliphatic hydrocarbon substituents, substituted heteroaromatic radicals containing unsubstituted saturated aliphatic hydrocarbon substituents, and secondary amines having unsubstituted saturated aliphatic hydrocarbon radicals, and Y is a material selected from the group consisting of hydrogen, unsubstituted saturated aliphatic hydrocarbon radicals, unsubstituted aromatic hydrocarbon radicals, substituted aromatic hydrocarbon radicals containing unsubstituted saturated aliphatic hydrocarbon substituents and substituted heteroaromatic radicals containing unsubstituted saturated aliphatic hydrocarbon substituents, and when X is said secondary amine then Y must be one of said hydrocarbon radicals.

From the foregoing broadly stated paragraph several factors of importance to the present invention become evident. First, it will be noted that to obtain the desired polymer the borazole must be heated to a temperature of 350–600° C. in a closed system. We have found that polymerization will not take place at temperatures lower than about 350° C. and at such temperatures the borazoles have a vapor pressure which would cause them to volatilize. Thus by using a closed system the substituted borazoles when heated build up their own pressure and depress the vapor pressure; or, in other words, prevent the material from volatilizing before polymerization is about to take place. It is to be understood that, if desired, additional pressure can be applied to the reaction; however, from an economic and practical standpoint this is unnecessary as long as the substituted borazole is heated in a closed system. Second, it will be noted that the substitutions on the boron atoms of the borazole molecule comprise unsubstituted saturated aliphatic hydrocarbon radicals, unsubstituted aromatic hydrocarbon radicals, substituted aromatic hydrocarbon radicals containing unsubstituted saturated aliphatic hydrocarbon substituents, substituted heteroaromatic radicals containing unsubstituted saturated aliphatic substituents, and secondary amines having unsubstituted saturated aliphatic hydrocarbon radicals.

Referring to the aliphatic hydrocarbon radicals, it is the intention of the present invention to completely exclude any substituted and/or unsaturated aliphatic hydrocarbon radicals. We have found that when hydrocarbon radicals having substituents are present on the borazole molecule, these substitutions act as functional groups which interfere with the polymerization of the borazole molecule. Additionally we have found that when unsaturated aliphatic hydrocarbon radicals are present on the borazole molecule a polymerization will take place between the double bonds of the unsaturated aliphatic hydrocarbon radicals before polymerization of the borazole molecule takes place.

Thus it is important to the present invention that only such radicals as defined in the above broadly stated paragraph can be attached to the boron and nitrogen atoms of the borazole molecule. The substitutions on the boron and nitrogen atoms may all be the same or they can be mixed, with the exception of course, as previously noted, that when one of the secondary amines is bonded to the boron atom then the nitrogen atom of the borazole ring must be bonded to one of the defined hydrocarbon radicals.

While the foregoing discussion discloses the formation of polymers by heating the substituted borazole under pressure at from 350–600° C., we have found that the presence of a catalyst enhances the reaction and allows the formation of polymers at lower temperatures and in increased yields. We have found that by the addition of a catalyst the formation of polymers can be made to take place at temperatures in the range of from 300–600° C., instead of 350° C. as noted when no catalyst is used. Such materials as primary and secondary amines, primary and secondary amine hydrochlorides, sodium amide, Grignard reagents, zinc bromide, potassium oxide, Friedel-Crafts catalysts and trifluoroacetic acid can be used to catalyze the formation of the present polymers.

We do not completely understand the type of catalytic action that takes place using such catalytic agents; however, the fact remains that the previously identified group of materials do act as catalysts and do aid in initiating the polymerization of the substituted borazole molecules.

While borazole molecules containing the previously identified radicals on the boron atoms and/or the nitrogen atoms are capable of producing polymers having high thermal stability, we have found that a particular group within this class of radicals bonded to the borazole molecule will produce polymers having even higher thermal stability.

Thus in the preferred embodiment of our invention we polymerize borazole molecules having methyl, phenyl, methyl substituted phenyl, methyl substituted biphenyl, and dimethyl-s-triazyl groups bonded to the boron and/or nitrogen atoms of the borazole molecule. Polymers produced from borazoles having these latter mentioned substituents will be found to be thermally stable up to temperatures of about 600° C. Polymers produced having larger hydrocarbon substituents than those latter mentioned substituents will be found to be thermally stable up to temperatures of 300–400° C.

As noted throughout the present specification, the polymers produced by the present invention have unusual thermal stability and they will be found to have utility as casting and molding resins for producing articles which are used in surroundings having high temperatures. Further, the present polymers will also be found to have utility as coatings for various kinds of wires. Still further, the present invention can be used to produce thermally stable polymeric liquids by controlling the degree of polymerization.

So that the present invention is more clearly understood, the following examples are given:

I

One gram of B-triphenyl-N-trimethylborazole was placed into a necked-down test tube. The test tube was chilled in liquid nitrogen, evacuated and sealed. The sealed tube was then heated for about 72 hours at 450–485° C.; after which time the tube was cooled, chilled in liquid nitrogen and opened. The opened tube was then placed in a sublimation apparatus and unreacted borazole was sublimed, collected and weighed. The resultant polymer was a hard, shiny black material which was insoluble in water, toluene, ether and hot and cold chloroform. It was not affected by cold or boiling concentrated sodium hydroxide solution or by concentrated sulfuric acid, but was decomposed by hot concentrated sulfuric acid. This resin when heated in a sealed tube did not decompose at temperatures of from 580–600° C.

II

One gram of B-triphenyl-N-trimethylborazole was placed into a necked-down test tube and 1–2 drops of diethylamine was added as catalyst. The test tube was chilled in liquid nitrogen, evacuated and sealed. The sealed tube was then heated for about 72 hours at about 365° C.; after which time the tube was cooled, chilled in liquid nitrogen and opened. The opened tube was then placed in a sublimation apparatus and unreacted borazole sublimed, collected and weighed. The resultant polymer was a hard, clear yellow, glassy resin having substantially the same properties as the polymer of Example I. This resin when heated in a sealed tube did not decompose at temperatures of 580–600° C.

III

Example II was repeated using potassium oxide as the catalyst and the results were substantially identical to those obtained in Example II.

IV

The technique of Example II was repeated using hexamethylborazole and n-butylamine as the catalyst. The resultant polymer was a dark, hard opaque material.

The foregoing examples show the polymerization of only two different substituted borazoles. Due to the fact that any of the foregoing defined substituted borazoles can be caused to polymerize, it appears unnecessarily repetitious to give other examples illustrating the present method and techniques of polymerizing these substituted borazoles.

No organic solvent was found in which the present polymers are soluble and therefore the molecular weights of these substances could not be determined. However, the insolubility of the present products indicates they have a molecular weight of at least 10,000. Further proof that the present products are true polymers is the fact that they can be fused, which shows that these materials are not merely cross-linked or a three-dimensional network.

The following list is illustrative of the many substituted borazoles which when caused to react using the present teachings will form polymers:

Hexamethylborazole
Hexaethylborazole
Hexaisopropylborazole
Hexa-n-propylborazole
Hexa-n-butylborazole
Hexa-isobutylborazole
Hexa-sec-butylborazole
Hexapentylborazole
Hexahexylborazole
Hexastearylborazole
Hexaphenylborazole
Hexabiphenylborazole
Hexanaphthylborazole
Hexakis(dimethyl-s-triazyl)borazole The foregoing list illustrates substituted borazole molecules containing the same substituents on all the boron and nitrogen atoms. As previously stated, the hydrocarbon substituents on the borazole molecules can be intermixed. Such materials as:

B-triphenyl-N-trimethylborazole
B-triethyl-N-triphenylborazole
B-trihexyl-N-triisopropylborazole
B-tris(biphenyl)-N-triethylborazole are only a few examples of the possible combinations and permutations of borazoles containing mixed substituents.

The following list is illustrative of substituted borazoles wherein the previously defined secondary amines are substituted on the boron atom and, as previously stated, in this case the nitrogen atom cannot contain hydrogen, but must contain one of the previously defined hydrocarbon radicals:

B-tris(dimethylamino)-N-trimethylborazole
B-tris(diethylamino)-N-triethylborazole
B-tris(diisopropylamino)-N-trimethylborazole
B-tris(di-n-octylamino)-N-triisopropylborazole Thus again only a limited enumeration of compounds are given merely for the purpose of illustrating the possible number of previously defined substituted borazoles which are intended to be included in the present invention.

Other modes of applying the principle of the invention may be employed, change being made as regards the details described, provided the features stated in any of the following claims or the equivalent of such be employed.

We, therefore, particularly point out and distinctly claim as our invention:

1. The method of producing fusable, thermally stable polymers which comprises heating a substituted borazole in a closed system at a temperature of from about 350–600° C., said borazole having the general formula

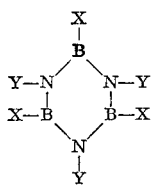

wherein X is a material selected from the class consisting of methyl, phenyl, methyl substituted phenyl, methyl substituted biphenyl and dimethyl-s-triazyl groups, and Y is a material selected from the class consisting of hydrogen, methyl, phenyl, methyl substituted phenyl, methyl substituted biphenyl and dimethyl-s-triazyl groups.

2. The method of producing fusable thermally stable polymers which comprises heating a substituted borazole in the presence of a catalyst in a closed system at a temperature of from 300–600° C., said catalyst selected from the group consisting of primary and secondary amines, primary and secondary amine hydrochlorides, sodium amide, Grignard reagents, zinc bromide, potassium oxide, Friedel-Crafts catalysts, and trifluoroacetic acid, and said borazole having the following general formula

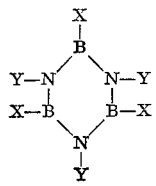

where X is a material selected from the group consisting of methyl, phenyl, methyl substituted phenyl, methyl substituted biphenyl, and dimethyl-s-triazyl groups, and Y is a material selected from the class consisting of hydrogen, methyl, phenyl, methyl substituted phenyl, methyl substituted biphenyl and dimethyl-s-triazyl groups.

3. The method of producing thermally stable polymers which comprises heating B-triphenyl-N-trimethylborazole in a closed system at a temperature of from about 350–600° C.

4. The method of producing thermally stable polymers which comprises heating hexamethylborazole in a closed system at a temperature of from about 350–600° C.

5. The method of producing thermally stable polymers which comprises heating B-triphenyl-N-trimethylborazole in the presence of a catalyst in a closed system at a temperature of from about 300–600° C., said catalyst selected from the group consisting of primary and secondary amines, primary and secondary amine hydrochlorides, sodium amide, Grignard reagents, zinc bromide, potassium oxide, Friedel-Crafts catalysts, and trifluoroacetic acid.

6. The method of claim 5 wherein said catalyst is diethylamine.

7. The method of producing thermally stable polymers which comprises heating hexamethylborazole in the presence of a catalyst in a closed system at a temperature of from 300–600° C., said catalyst selected from the group consisting of primary and secondary amines, primary and secondary amine hydrochlorides, sodium amide, Grignard reagents, zinc bromide, potassium oxide, Friedel-Crafts catalysts, and trifluoroacetic acid.

8. The method of claim 7 wherein said catalyst is n-butylamine.

9. A new thermally stable polymer comprising the product of claim 1.

10. A new thermally stable polymer comprising the product of claim 2.

11. Polymerized B-triphenyl-N-trimethyl-borazole, said polymer being fusable, thermally stable and unaffected by concentrated sodium hydroxide solution.

12. Polymerized hexamethylborazole, said polymer being fusable, thermally stable and unaffected by concentrated sodium hydroxide solution.

References Cited in the file of this patent

UNITED STATES PATENTS 2,892,869    Groszos et al. _____ June 30, 1959

OTHER REFERENCES

Chemical and Engineering News, page 1994, April 23, 1956.

Aubrey et al.: Journal Chemical Society (London), pages 2927–2931, September 1959.

Wiberg et al.: Berichte, vol. 73, pages 209–232 (1940).

Lappert: Proceedings of the Chemical Society, February 1959, page 59.